United States Patent Office 2,943,118
Patented June 28, 1960

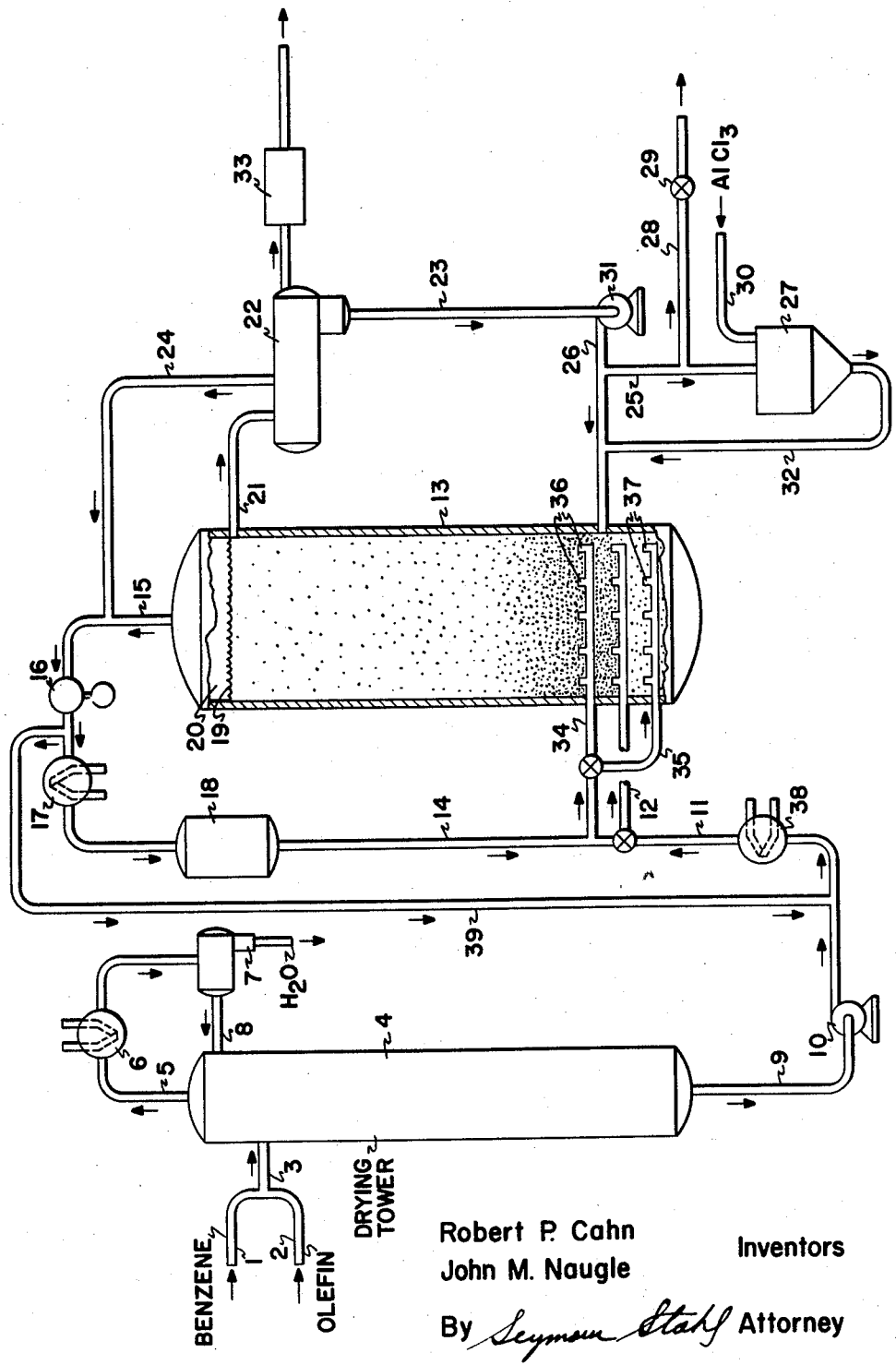

2,943,118
ALKYLATION OF AROMATICS

Robert P. Cahn, Elizabeth, and John M. Naugle, Livingston, N.J., assignors to Esso Research and Engineering Company, a corporation of Delaware Filed May 14, 1957, Ser. No. 659,068

7 Claims. (Cl. 260—671)

This invention relates to certain improvements in the continuous manufacture of alkylated aromatic compounds especially adapted for low temperature operation.

One of the preferred known methods for the commercial alkylation of benzene or other aromatic compounds basically comprises passing benzene and olefin feed through a bed of catalyst sludge at ambient (50° F.) to slightly elevated temperatures. The catalyst sludge is usually aluminum chloride in a hydrocarbon mixture such as benzene and alkylate, having a high viscosity, especially at low temperatures. The liquid alkylate product separates from the heavier sludge which remains at the bottom of the reaction zone. Product is then passed to chemical treating tanks, such as caustic washing and the like, and finally to finishing stages involving several fractionators to recover light, heavy and the so-called detergent alkylate, the latter being suitable for the manufacture of alkyl aromatic sulfonates having exceptional detergency properties. It is known that the alkylation reaction proceeds smoothly with aluminum chloride and small amounts of HCl promoter, or similar halide catalysts such as HF, $BF_3$ and the like, at temperatures of 115° to 50° F. and lower. However it has been found that highest yields are obtained at lower temperatures, e.g. 32° to 50° F. Thus, it has been found that in this range, detergent alkylate yield increases about 2% for each 15° F. decrease in temperature. It is recognized that an intimate admixture of the sludge with the feed is necessary for high conversions and different means of agitating the sludge layer to obtain the desired intimate mixture have been tried with varying degrees of success. Two of the better known means for this agitation include the use of jet type feed injection apparatus and turbo mixers within the reactor itself. The jet feed injection is suitable for high temperature operation, e.g. 70° to 115° F. but is inefficient at lower temperatures due to the high viscosity of the sludge. Turbo mixers are efficient but expensive and subject to considerable mechanical maintenance.

In prior art processes the temperatures of this exothermic reaction are generally controlled by refrigeration of the olefin-aromatic feed and by a pump-around cooling circuit on the reactor. In order to maintain the temperatures within the reactor at about 50° F. it is necessary to refrigerate the feed and pump-around to below this temperature. At lower temperatures the olefin-aromatic feed tends to crystallize on the cooling surface due to the cold wall temperature, causing various clogging difficulties and even requiring constant scraping of the refrigeration apparatus to maintain the operation on a continuous basis. In view of the difficulties involved in this refrigeration step, temperatures in the reaction zone are normally maintained at or above 50° F. unless an excessively large cooling surface is installed to avoid cold wall temperatures below the freezing point of the reaction mixture.

It is an object of this invention to provide means for operating a continuous process for the alkylation of aromatics at any temperature from about 32° F. to 115° F., preferably 32° to 60° F., without realizing the difficulties which may be encountered employing external refrigeration apparatus. It is a further object of this invention to provide turbulence within the reactor to promote better contact between the reactants and the viscous catalyst sludge by simple and inexpensive means. This invention is an improvement over the alkylation process described with some detail in a patent to W. J. Paltz, U.S. 2,667,519.

For a more complete understanding of the invention reference will now be had to the accompanying drawing which sets forth a flow plan of the continuous process for the alkylation of benzene. It is pointed out that the final treatment of the alkyl aromatic compounds, e.g. distillation, sulfonation, etc., forms no part of the present invention.

Referring to the drawing, benzene, alkyl benzene such as toluene, naphthalene, phenols and their homologues, other aromatics or mixtures thereof and olefin are passed via lines 1, 2 and 3 to an azeotropic drying tower 4. The olefin employed may be straight or branch chained and generally will contain from 6 to 24 carbon atoms in the molecule. One of the preferred olefins for this process which yields valuable alkylates for the production of superior sulfonated detergents is ($C_{12}$) tetrapropylene, prepared by polymerizing propylene in the presence of an acid catalyst, e.g. phosphoric acid. Other suitable olefins include $C_7$-$C_{11}$, or $C_{13}$-$C_{24}$ olefin fractions obtained generally by the above polymerization technique. These olefin fractions will contain primary, secondary and tertiary olefins, e.g. types I, II, III, IV, and V. In order to produce largely mono-alkyl aromatic compounds rather than di- or poly-alkylated aromatics it is preferred to maintain a relatively high ratio of aromatic to olefin feed in the reactor. Accordingly, if benzene recycle is not employed the feed may comprise a benzene to $C_{12}$ olefin molar ratio of from 2:1 to 20:1, preferably between 5 and 15:1. Generally the system will contain provisions for recycling benzene from fractionators subsequent to the reactor, in which case the ratio of benzene to olefin in the fresh feed may be lowered while still maintaining a high benzene-olefin ratio in the reactor. In the drying tower aromatic hydrocarbon which may constitute part of the feed acts as an entrainer for removing water vapor overhead via line 5 which is then cooled in cooler 6 and separated through exit 7. Typical conditions for azeotropic drying will include bottoms temperature in the range of 175° to 210° F. and top temperatures of 160° to 200° F. with pressures of atmospheric to 25 p.s.i.a. Hydrocarbon entrainer may be admitted back to the drying tower via line 8. It should be noted that while an azeotropic drying tower is shown in the drawing other means such as alumina driers, calcium chloride driers, etc., may be employed. It is however essential to the efficient operation that the feed be dried to about 10 to 50 p.p.m. water. Small amounts of water may be left in the feed to react with the $AlCl_3$ catalyst to yield HCl, a promoter for the alkylation reaction. If the reaction should be carried out under substantially anhydrous conditions, a small amount of HCl, e.g. 0.02–0.5 lb./lb. $AlCl_3$, should be added as a promoter. The dried feed is then taken from the drying tower via line 9, cooled in water cooler or exchanger 38 and pumped via 10 through lines 11 and 12 into the lower portion of the primary reactor 13. The primary reactor will contain a large amount of sludge comprising aluminum chloride in hydrocarbon which may occupy from one-fourth to two-thirds of the reactor space. A typical sludge will comprise about equal amounts by weight of $AlCl_3$, benzene and alkylate although these proportions may vary considerably. Various other inorganic halide alkylation catalysts may be used including $BF_3$, anhydrous liquid HF, mixtures of $BF_3$ with HF.

Liquid propane or another inert light hydrocarbon gas which is normally gaseous at the temperatures employed for this reaction, such as butane or ethane, is fed into primary reactor 13 via lines 14 and 12 to act as a turbulence promoter and refrigerant. Instead of passing the liquid propane into the reactor with the feed it may be injected into the reactor above or below the feed injection point through lines 34 or 35, via spargers 36 or 37. Suitable pumping apparatus of course will be necessary. By employing the propane as a refrigerant within the reactor 13 it thus is unnecessary to cool the feed by external refrigeration although the use of supplemental cooling means is not excluded from this invention. Thus the reactor may be operated at temperatures as low as about 32° F. whereas this would be impossible or at least impractical employing external refrigeration due to the crystallization of the feed. The propane liquid vaporizes within the reactor thereby agitating the sludge layer while at the same time cooling the reaction mixture and maintaining the conditions within the desired low operating temperature range. The temperature of this exothermic reaction is controlled precisely by controlling the amount of propane liquid fed into the reactor and the pressure in the reactor. Continuing, the propane gas is taken overhead via line 15, passed through compressor and cooler 16 and 17 whereby the gas is liquefied and stored in drum 18 under a pressure of 150 to 275 p.s.i.a. Alternately, the propane vapor from compressor 16 can be injected into the hydrocarbon feed line after pump 10 via line 39 and condensed with the feed in cooler 38. This eliminates condenser 17 and permits condensation of the propane at a lower pressure, say 115 to 165 p.s.i.a., thus decreasing the work required in compressor 16. From this point propane is recycled to the reactor. Numeral 19 points to the level of the liquid reaction product mixture which comprises alkylated aromatics as well as unreacted aromatics and minor amounts of the sludge particles which may find their way to the top of the tower due to the internal agitation induced by the propane gas. Zone 20 will comprise primarily gaseous propane which is taken overhead via line 15 and recycled as previously noted. Reaction product and unreacted aromatics are taken off via line 21 and passed to a settling zone 22 for the purpose of removing any entrained catalyst sludge which is recirculated via line 23, pump 31 and line 26. Propane gas which may find its way into settler 22 can be taken overhead via line 24 and directed back into the recycle stream via the compressor. In this process the catalyst sludge is being continuously inactivated and diluted, thus requiring the addition of fresh aluminum chloride to the sludge. Accordingly sludge is withdrawn via line 25 and passed to a slurry vessel 27. The amount of sludge maintained within the reactor may be easily controlled by withdrawing any excess via line 28 through valve 29. Fresh solid aluminum chloride which may contain some HCl is added to the withdrawn sludge in the slurried vessel 27 via line 30 and fresh sludge is recycled to reactor 13 through line 32. Detergent alkylate product which is recovered from settler 22 is passed to a chemical treating unit 33 wherein a clean-up operation such as neutralization with aqueous caustic for removal of residual traces of acidic substances is performed. The product is then passed through several fractionating towers, not shown, to recover light alkylates, B.R. 425° to 520° F., heavy alkylates, B.R. 600° F.+, and the desired so-called detergent alkylates, B.R. 520° to 600° F. The boiling ranges set forth are only approximate and may vary depending on which particular properties are desired in the final sulfonate detergents. Unreacted aromatics which may be recovered in the initial fractionation of the product mixture are preferably recycled to the feed, usually at a point prior to the drying tower. An additional recycling system may also be included to maintain a high state of agitation within the reactor. This latter recycle stream would comprise recycling a portion of the product mixture such as withdrawn from line 21 to the reactor via line 12. It is apparent that this invention is amenable to various modifications which cannot be described in complete detail without unduly lengthening the specification.

EXAMPLE

The following example sets forth the conditions for a preferred embodiment of this invention with regard to the drawing.

*Operating conditions*

Drying tower, feed rates:
  Fresh benzene, lb./hr. (wet) _____ 209
  Fresh tetramer ($C_{12}$ olefin), lb./hr. (wet) ___ 358
  Recycle benzene, lb./hr. (wet) _____ 1,879

Total drying tower feed, lb./hr. (wet) ____ 2,446

Drying tower bottoms (reactor feed), lb./hr. 2,424
Drying tower overhead product (water), lb./hr. _____ 22
Drying tower reflux/feed ratio (wt.) _____ 0.5:1

Drying tower conditions:
  Pressure, p.s.i.a.—
    Tower _____ 17.4
    Distillate drum _____ 14.7
  Temperature, ° F.—
    Top of tower _____ 200
    Reflux drum _____ 95
    Reboiler _____ 208

Reactor conditions:
  HCl addition rate, lb./hr. _____ .8
  $AlCl_3$ addition rate, lb./hr. _____ 21.0
  Spent sludge withdrawn, lb./hr. _____ 76.4
  Wt. percent $AlCl_3$ in spent sludge _____ 28.0
  Ratio of benzene/olefin in fresh feed (molar) 1.3:1
  Ratio of benzene/olefin in total feed (molar) 13:1
  Sludge/hydrocarbon ratio (vol.) _____ 1:1
  Hold-up time for feed in reactor, minutes____ 30
  Reactor feed temperature, ° F. _____ 100
  Total reactor feed.—
    Benzene+tetramer, lb./hr. _____ 2,424
    Propane from benzene recycle, lb./hr. __ 130
    Propane recirculated through compressor, lb./hr. _____ 1,222

Total, lb./hr. _____ 3,776

Reactor pressure, p.s.i.a. _____ 14.7
Reactor temperature, ° F. _____ 50
Propane vaporized in reactor, lb./hr. _____ 1,222
Propane condensing pressure, p.s.i.a. _____ 60
Propane condensing temperature, ° F. _____ 100
Propane in reactor effluent, lb./hr. _____ 130

Yield of alkylate after washing and fractionation:
  Light alkylate, 300°–520° F. range, lb./hr. __ 102
  Detergent alkylate, 520°–600° F. range, lb./hr. _____ 380
  Heavy alkylate, 600° F.+, lb./hr. _____ 58

In summary it will be seen that the present invention eliminates or at least substantially minimizes the need for external and internal refrigeration coils, thus permitting low temperature operation. Crystallization of the feed mixture within the refrigeration coils is avoided and desired turbulence is promoted within the reactor without resort to mechanical mixers and the like. Auto-refrigeration thus permits lower than conventional operating temperatures with an appreciable increase in detergent alkylate yield.

What is claimed is:

1. In a process for alkylating benzene with a $C_6$–$C_{24}$ olefin by passing said olefin through a reaction zone containing an aluminium chloride catalyst in the form of a sludge and separating the product mixture containing alkylated benzene from said sludge in an upper portion of said reaction zone, the improvement which comprises supplying to a lower portion of said reaction zone an inert, light normally gaseous saturated hydrocarbon in liquid form, said hydrocarbon being normally gaseous under the conditions of reaction, whereby the liquid hydrocarbon vaporizes in said reaction zone and is introduced in an amount sufficient to agitate the sludge layer, thereby promoting intimate contact between the olefin, benzene, reactants and said sludge, said hydrocarbon also being introduced in an amount sufficient to maintain the temperature within said reaction zone between about 32° to 60° F., recovering light gaseous hydrocarbon and alkylated benzene from an upper portion of said zone, separating and compressing light gaseous hydrocarbon into its liquid form and recycling liquid normally gaseous hydrocarbon to a lower portion of said reaction zone.

2. A process in accordance with claim 1 wherein a high benzene to olefin ratio is maintained within said reactor.

3. A process in accordance with claim 1 wherein said reaction takes place in the presence of minor amounts of HCl.

4. A continuous process for the preparation of alkylated aromatics which comprises feeding benzene and a $C_6$–$C_{24}$ olefin into a reaction zone containing aluminum chloride catalyst in the form of a sludge and simultaneously feeding into a lower portion of said reaction zone propane in liquid form in an amount sufficient to maintain a temperature within said reactor between 32° to 60° F., whereby good contact between said sludge, olefin and benzene is effected, withdrawing from an upper portion of said zone propane in vaporous form, compressing and cooling said vaporous hydrocarbon into liquid form and recycling said liquid normally gaseous hydrocarbon into a lower portion of said reaction zone, withdrawing from an upper portion of said reaction zone liquid alkylated aromatic product.

5. A process in accordance with claim 4 wherein said propane after being compressed is condensed in the presence of benzene and olefin feed.

6. A process in accordance with claim 4 wherein minor amounts of HCl are present in the reaction zone.

7. A process according to claim 4 wherein the $C_6$ to $C_{24}$ olefin feed to the reaction zone is substantially $C_{12}$ olefin.

References Cited in the file of this patent
UNITED STATES PATENTS

| | | |
|---|---|---|
| 2,437,356 | Hill | Mar. 9, 1948 |
| 2,439,080 | Davies | Apr. 6, 1948 |
| 2,441,249 | Ocon et al. | May 11, 1948 |
| 2,465,610 | Short | Mar. 29, 1949 |